United States Patent [19]
Goff

[11] Patent Number: 5,326,075
[45] Date of Patent: Jul. 5, 1994

[54] STOP ASSEMBLY FOR A VALVE

[75] Inventor: David W. Goff, Morgantown, W. Va.

[73] Assignee: Sterling Plumbing Group, Inc., Rolling Meadows, Ill.

[21] Appl. No.: 51,498

[22] Filed: Apr. 22, 1993

[51] Int. Cl.⁵ .............................................. F16K 51/00
[52] U.S. Cl. .................... 251/285; 251/288; 137/359
[58] Field of Search ................ 251/285, 288, 286; 137/359

[56] References Cited

U.S. PATENT DOCUMENTS

| | | | |
|---|---|---|---|
| 845,540 | 2/1907 | Ferguson et al. | 251/286 X |
| 3,397,863 | 8/1968 | Bell | 251/285 |
| 3,559,684 | 2/1971 | Rudewick, III | 251/285 X |
| 3,724,480 | 4/1973 | Povalski et al. | 137/98 |
| 3,916,951 | 11/1975 | Schmitt | 137/625.41 |
| 3,964,514 | 6/1976 | Manoogian et al. | 251/285 X |
| 4,089,347 | 5/1978 | Christo | 251/285 X |
| 4,313,350 | 2/1982 | Keller, III et al. | 74/526 |
| 4,387,880 | 6/1983 | Saarisalo et al. | 251/285 |
| 4,423,752 | 1/1984 | Psarouthakis | 137/625.41 |
| 4,813,455 | 3/1989 | Iqbal | 137/625.17 |
| 5,022,631 | 6/1991 | Wagner et al. | 251/185 |
| 5,048,792 | 9/1991 | Fischer | 251/288 X |

FOREIGN PATENT DOCUMENTS 2815990 10/1979 Fed. Rep. of Germany .
320865 4/1957 Switzerland ........................ 251/285

OTHER PUBLICATIONS

Photograph showing the bottom of a Sterling Faucet Co. escutcheon with an elastic ring retaining a valve stem thereon, Date unknown.

Primary Examiner—John Rivell
Attorney, Agent, or Firm—Quarles & Brady

[57] ABSTRACT

A stop assembly for a valve is disclosed. Two stop rings are interfitted by meshing teeth and driven by a valve stem. In one embodiment, an escutcheon provides a mounting for one of the ring members as well as a stop surface for contact with both rings. The stop assembly provides a stop for maximum rotation of a valve member, as well as an adjustable temperature stop function.

3 Claims, 3 Drawing Sheets

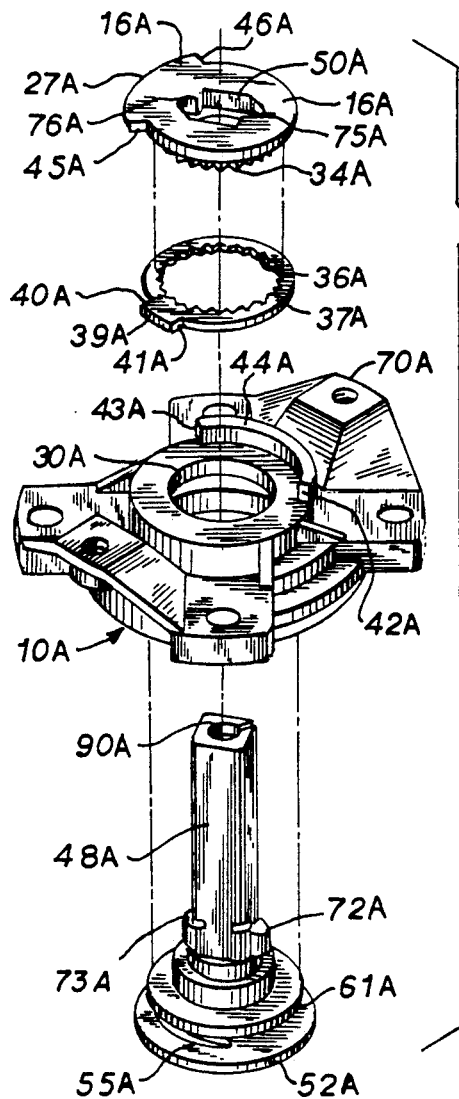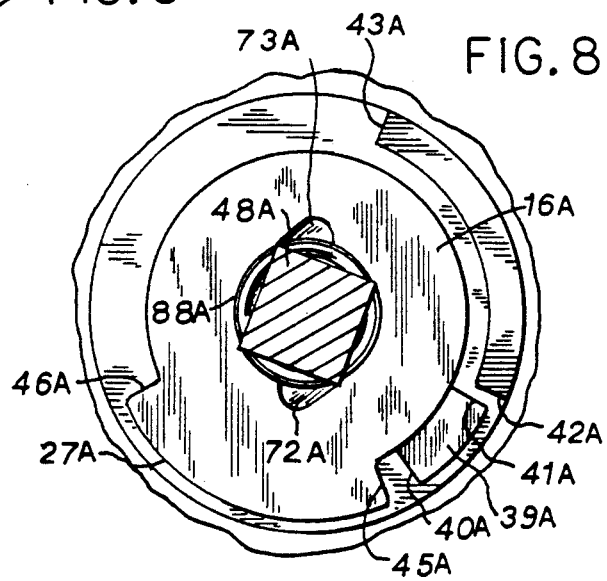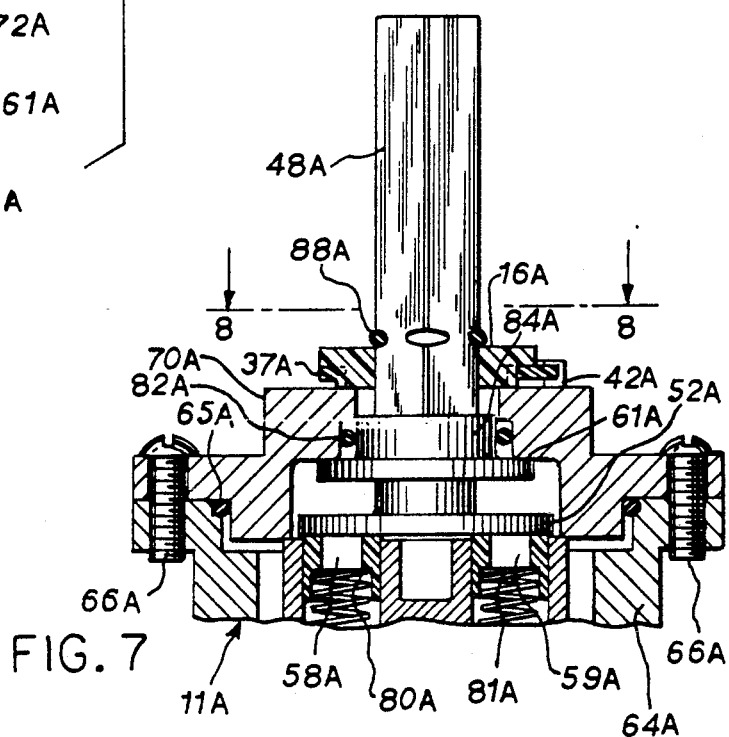

1

STOP ASSEMBLY FOR A VALVE

BACKGROUND OF THE INVENTION

A. Field of the Invention

This invention relates primarily to valves which control the mix of hot and cold water. The invention appears best suited to providing a valve wherein the full hot limit of the valve can be easily adjusted.

B. Description of the Art

It is desirable to conserve energy by setting water temperature maximum at the lowest temperature acceptable to the user. Because of differences and variability in water heater systems, and differences in consumer preferences, only a rough adjustment can be made at the factory. The final adjustment must be made after the valve is installed. This is preferably something that can be changed from time to time without requiring the disassembly of the valve components and without the need for special tools and special plumbing skills. This might be particularly desirable in an apartment building so that an adjustment can be made when new tenants move in.

U.S. Pat. Nos. 4,387,880; 4,423,752; 4,813,455 and German patent 28 15 990 show various stop systems for valves. These systems rely upon a radial projection from a rotatable valve stem abutting against a projection from the valve housing or cap. However, these systems either do not allow for easy temperature adjustment or involve other complex multicomponent devices, or require use of parts which are susceptible to wear or breakage.

Thus, it can be seen that a need exists for an improved valve stop system.

SUMMARY OF THE INVENTION

In one aspect, the invention provides a stop assembly for use with a valve having a rotatable valve stem that projects through a covering element. A projection means is disposed on the covering element forming a first stop and a second stop. A first stop ring is mounted around the valve stem adjacent the covering element. It is adapted to rotate when the stem rotates. It has at least one stop surface extending radially therefrom. A second stop ring is mounted around the valve stem adjacent the covering element and is adapted to rotate when the stem rotates and has at least one stop face extending radially therefrom. There are interfitment means which can adjustably fix the circumferential position of the stop surface relative to the stop face. The parts are juxtaposed such that upon stem rotation the stop surface can contact the first stop to define a first rotational limit, and the stop face can cut out the stop surfaces to define an adjustable second rotational limit.

In a preferred form, the first and second stops are positioned on an escutcheon.

In an alternative form, the first and second stops are positioned on a valve cap.

In another aspect, the interfitment means includes outer teeth on the first stop ring to engage inner teeth on the second stop ring.

In yet another aspect, a stop ring is connected to an escutcheon by an elastic ring member.

The objects of the invention therefore include providing a stop of the above kind:

a. which is readily accessible;
b. which can provide for multiple stop functions for the valve member;
c. which can be manufactured with few parts;
d. wherein the stop stresses are split between two rings; and
e. which is adaptable to various valve types.

These and still other objects and advantages of the invention will be apparent from the description which follows. In the detailed description below, the preferred embodiments of the invention will be described in reference to the accompanying drawings. These embodiments do not represent the full scope of the invention. Rather, the invention may be employed in other embodiments. Reference should therefore be made to the claims herein for interpreting the breadth of the invention.

BRIEF DESCRIPTION OF THE DRAWINGS

FIG. 6 is an exploded perspective view similar to FIG. 2, showing an alternative embodiment of the present invention;

FIG. 7 is a view in partial section of the assembled embodiment shown in FIG. 6; and FIG. 8 is a sectional view taken along line 8—8 of FIG. 7.

DESCRIPTION OF THE PREFERRED EMBODIMENTS

Figure 1:
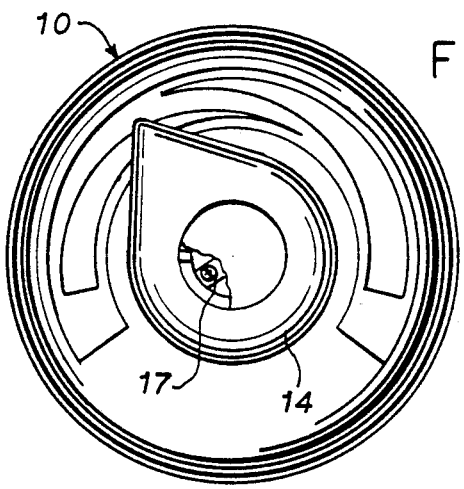
FIG. 1 is a front elevational view, with a portion broken away, showing an escutcheon and a valve operating handle for use in conjunction with an embodiment of the invention.
Figure 5:
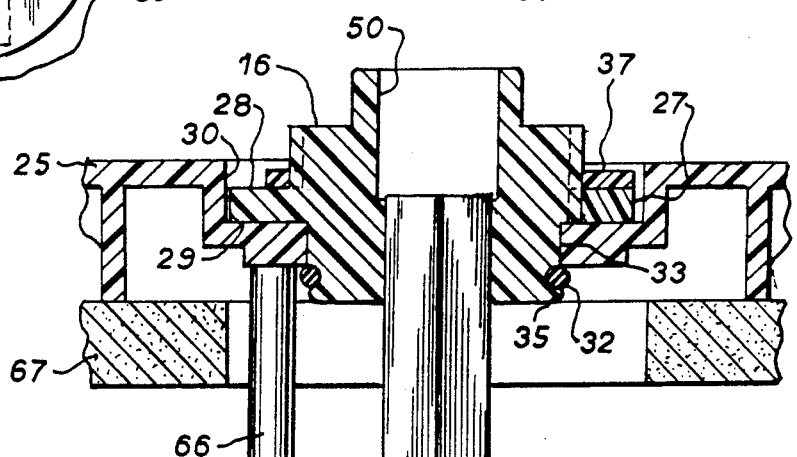
FIG. 5 is a sectional view taken along line 5—5 of FIG. 3.
Figure 5:
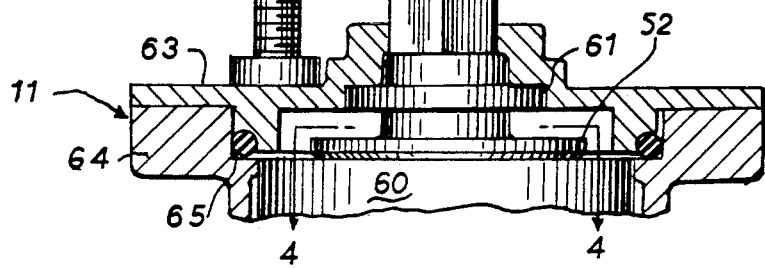
Figure 2:
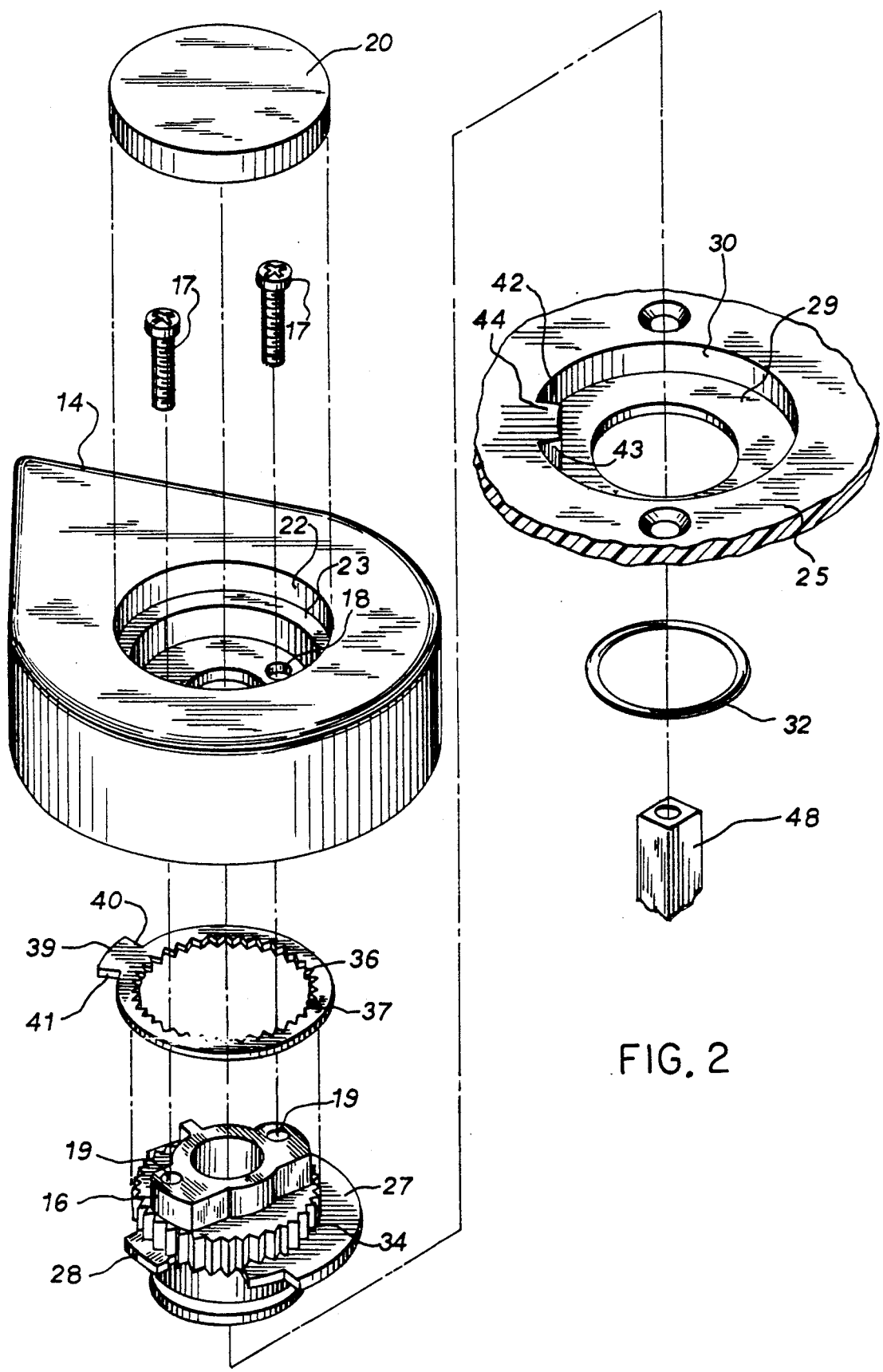
FIG. 2 is an exploded perspective view of the valve parts constituting a preferred embodiment of the invention.

Referring to FIGS. 1, 2 and 5, the valve stop assembly, generally 10, is shown in conjunction with a pressure compensating mixing valve generally 11 of the type described in U.S. Pat. No. 3,724,480 (which teachings are incorporated herein by reference). It includes a handle 14 for attachment to a stem driver 16 by means of self-tapping screws 17 passing through holes 18 in the handle and into self tapping openings 19. A cover 20 is provided for cavity 22, the cover being wedged onto ledge 23. Stem driver 16 is rotatably retained in escutcheon 25 by the flange portions 27 and 28 engaging the floor portion 29 in the cavity 30, by the elastic seal ring 32 at the opposing side which is held in annular groove 35, and by a close frictional fit of the stem driver 16 through opening 33.

Figure 3:
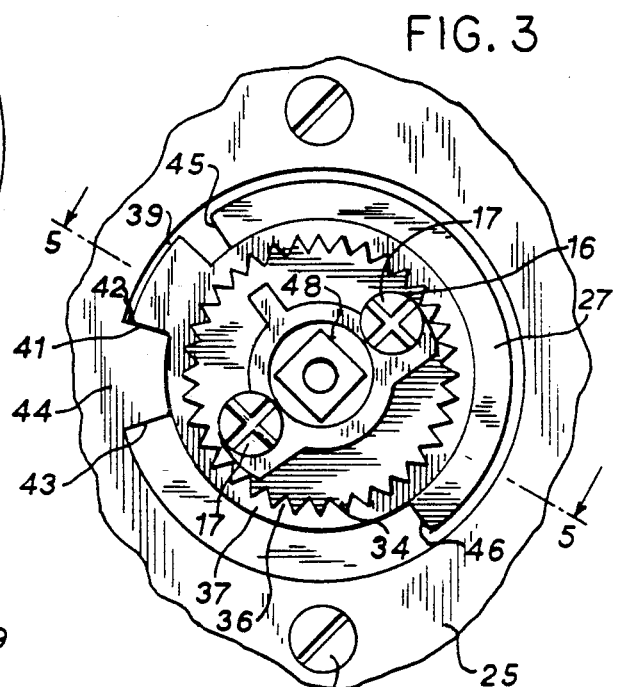
FIG. 3 is an enlarged frontal view of FIG. 1, with the handle of FIG. 1 removed.

The stem driver 16 has external teeth 34 for receiving the internal teeth 36 of the adjustment stop ring 37 when stop ring 37 is seated on the flange 27 of the stem driver 16. Adjustment stop ring 37 has a stop projection 39 with stop faces 40 and 41 for contact with the stop faces 42 and 43 of the stop member 44 of the escutcheon 25. This is best seen in FIG. 3. It should also be seen in FIG. 3 that the stem driver 16 has two opposing stop surfaces 45 and 46 positioned on flange 27 which provides a second stop ring also for contact with the respective stop surfaces 42 and 43 of the escutcheon stop member 44, albeit below stop ring 37.

Figure 4:
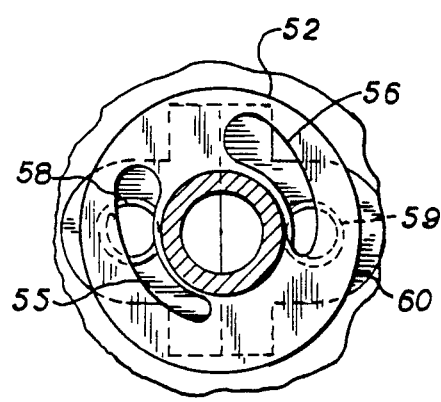
FIG. 4 is a sectional view taken along line 4—4 of FIG. 5.

FIGS. 4 and 5 illustrate the valve stop assembly 10 in conjunction with the pressure balanced mixing valve 11. A valve stem 48 of mixing valve 11 projects through the stem driver 16 in compartment 50, and rotation of the driver rotates the stem. Connected to the opposite end of the valve stem 48 is a fluid control plate 52 having the usual passages 55 and 56 which control the passage of fluid from the hot and cold water ports 58 and 59 in a cartridge type valve body 60. The control plate 52 is rotatably maintained over the valve body 60 by the flange 61 seated in the cover 63 which is appropriately sealed to the valve housing 64 by seal 65.

The escutcheon 25 is connected to the mixing valve 11 by screws, one of which is shown at 66, and threadably engages the valve housing 64. As shown in FIG. 5, there is a space between the mixing valve 11 and a support member 67. This is for the purpose of providing suitable insulation (not shown) if desired. Otherwise, the valve cover 63 can be drawn up snug to the underside of the support member 67.

Outside temperature limits are afforded by the stop surfaces 45 and 46 on the stem driver 16 which contact the stop surfaces 42 and 43 on the escutcheon 25. This contact limits maximum rotation of the stem 48 and, accordingly, the amount of rotation of the guide plate passages 55 and 56 over the valve ports 58 and 59, which ultimately controls the passage of hot and cold water from the ports 58 and 59.

In a preferred manner, the stop surfaces 45 and 46 provide a rotation of 150° of the control plate 52. It is desirable at times (e.g. energy savings, personal preference) to further control the maximum temperature at which hot water passes from port 58. This is effected by the stop ring 37 and its adjustable placement on the stem driver 16 by means of the teeth 36 and 34. Referring specifically to FIG. 3, it is seen that the stop surface 41 of the maximum temperature control stop ring 37 will contact the stop surface 42 of the escutcheon before contact with the stop surface 45 of the stem driver 16 when rotated in a counterclockwise manner. This limits the extent to which the passage 55 communicates with the port 58 and, accordingly, the amount of hot water passing therethrough.

It should be noted that preferably, in all cases, the cold stop (the most used stop) will be between the face 46 of sturdy driver 16 and stop 43. In normal use, stop 45 will never be used. Thus, the stresses on the ring 37 are less and allow for it to be made of a lesser strength material than driver 16.

Referring to the alternative embodiment generally 10A shown in FIGS. 6-8, the same or similar components are designated with the same reference numerals as for the first embodiment, except followed by the letter "A". One of the differences between the two embodiments is the stop surfaces 42A and 43A on a valve cover 70A, rather than on an outer escutcheon cover 25. Other differences are the placement of the stop ring 37A under the stem driver 16A, and the manner in which the stem 48A drives the stem driver 16A (which is effected by the projections 72A and 73A of the stem 48A engaging the cut outs 75A and 76A in the stem driver 16A).

Embodiment 10A also has spring loaded valve seats 80A and 81A in the valve housing 64A as well as seals 65A and 82A between the valve cap 70A and the valve housing 64A and the flange body 84A of the flange 61A. The valve stem 48A is retained on the valve cap 70A by the O-ring 88A engaging the stem driver 16A. A suitable handle (not shown) can be connected to the valve stem 48A such as by a screw (not shown) engaging the threaded passage 90A.

Embodiment 10A operates in the same manner as embodiment 10 with respect to water temperature control and the uncovering of the ports 58A and 59A in conjunction with the passages in the control plate 52A such as shown at 55A. The difference is the contact of the stem driver 16A stop surfaces 45A and 46A as well as the stop ring stop faces 40A and 41A with the stop surfaces 42A and 43A of the valve cap 70A rather than with the escutcheon 25 in embodiment 10.

It will therefore be appreciated that water temperature control is provided for in a rotary type valve wherein a control ring is easily accessible for adjustment purposes. All that is required is the removal of a handle such as 14 for access to the control ring at the top. The ring can then be selectively replaced to a desired position. Maximum rotation of the stem as well as a maximum temperature control is afforded in a device requiring few parts and which is adaptable for use with a stop which can be positioned on either an escutcheon or a valve cap. Also the cold stop and hot stop tortional forces can be transmitted through different rings, thereby increasing the life of each and permitting optimization of each ring.

Further cost reduction is effected by the stem drivers, the control rings, the escutcheon and the valve cap all preferably being composed of a plastic material. In the instance of the escutcheon, it can be metal coated for aesthetic purposes. Note that stop ring 27 is connected to escutcheon 25 by the elastic ring member 32.

Thus, the invention provides an improved valve stop assembly. While the preferred embodiments have been described above, it should be readily apparent to those skilled in the art that a number of modifications and changes may be made without departing from the spirit and scope of the invention. For example, while a plumbing valve has been shown, the control device can be used with other types of fluid valves including other types of pressure compensated mixing valves such as disclosed in U.S. Pat. No. 3,921,659. Also, the specific materials mentioned are not the only materials which can be used. In addition, with respect to embodiment 10A, a suitable handle could be rotatably mounted to an escutcheon such as in embodiment 10 rather than the valve stem 48A with a separate piece such as a stem driver 16 engaging the valve stem 48A to effect rotation. All such and other modifications within the spirit of the invention are meant to be in the scope of the invention.

I claim:

1. A stop assembly for use with a valve having a rotatable valve stem that projects through a covering element, comprising:

a projection means on the covering element forming a first stop and a second stop, said first and second stops being located on an escutcheon;

a first stop ring mounted around the valve stem adjacent the covering element, adapted to rotate when the stem rotates, and having two stop surfaces extending radially therefrom;

a second stop ring mounted around the valve stem adjacent the covering element adapted to rotate when the stem rotates and having at least one stop face extending radially therefrom;

interfitment means which can adjustably fix the circumferential position of the stop surface relative to the stop face; and the parts being juxtaposed such that upon stem rotation a first stop surface can contact the first stop to define a first rotational limit in one rotational direction, and the stop face can cut out the other of the stop surfaces so as to define an adjustable second rotational limit in one rotational direction opposite to the first.

2. A stop assembly for use with a valve having a rotatable valve stem that projects through a covering element, comprising:
- a projection means on the covering element forming a first stop and a second stop;
- a first stop ring mounted around the valve stem adjacent the covering element, adapted to rotate when the stem rotates, and having two stop surfaces extending radially therefrom;
- a second stop ring mounted around the valve stem adjacent the covering element adapted to rotate when the stem rotates and having at least one stop face extending radially therefrom;
- interfitment means which can adjustably fix the circumferential position of the stop surface relative to the stop face said interfitment means including outer teeth on the first stop ring and engage inner teeth on the second stop ring; and
- the parts being juxtaposed such that upon stem rotation a first stop surface can contact the first stop to define a first rotational limit in one rotational direction, and the stop face can cut out the other of the stop surfaces to define an adjustable second rotational limit in one rotational direction opposite to the first.

3. A stop assembly for use with a valve having a rotatable valve stem that projects through a stationary covering element, comprising:
- a projection means on the stationary covering element forming a first stop and a second stop;
- a first stop ring mounted around the valve stem adjacent the covering element, adapted to rotate when the stem rotates, and having two stop surfaces extending radially therefrom;
- a second stop ring mounted around the valve stem adjacent the covering element adapted to rotate when the stem rotates and having at least one stop face extending radially therefrom;
- one of said first and second stop rings being connected to an escutcheon by an elastic ring member;
- interfitment means which can adjustably fix the circumferential position of the stop surface relative to the stop face; and
- the parts being juxtaposed such that upon stem rotation a first stop surface can contact the first stop to define a first rotational limit in one rotational direction, and the stop face can cut out the other of the stop surfaces so as to define an adjustable second rotational limit in one rotational direction opposite to the first.

* * * * *